W. H. THIEMER.
UNIVERSAL JOINT.
APPLICATION FILED APR. 4, 1919.
1,366,036.
Patented Jan. 18, 1921.
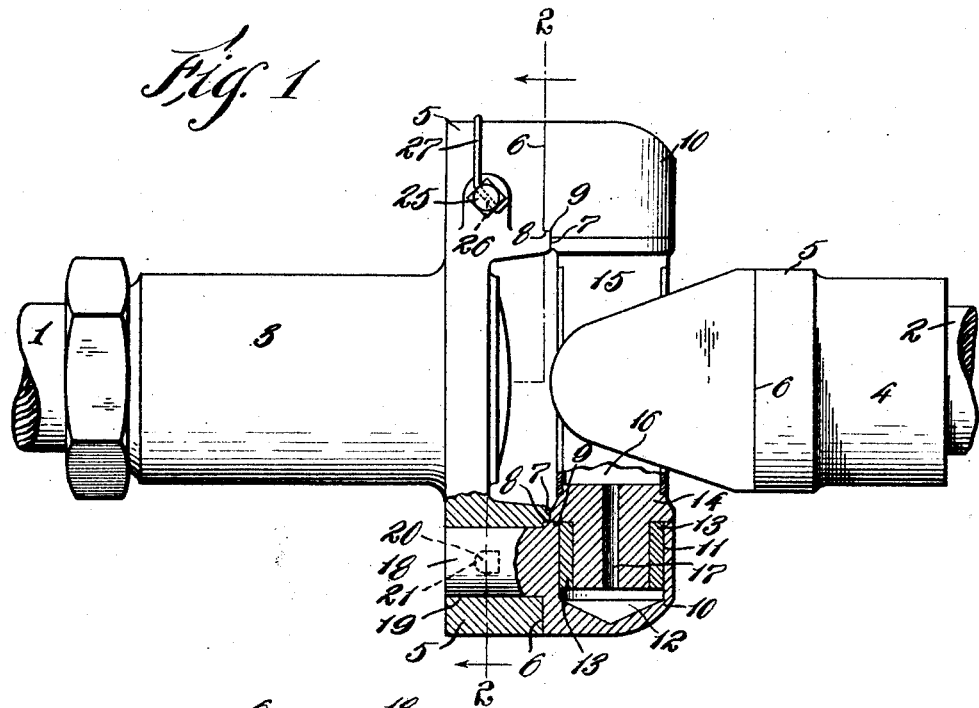
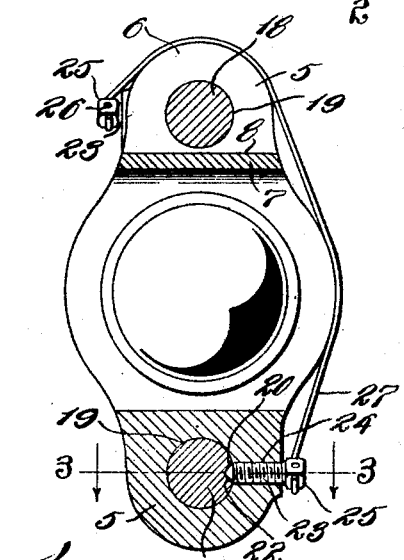

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,366,036. Specification of Letters Patent. Patented Jan. 18, 1921.

Application filed April 4, 1919. Serial No. 287,558.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints of the type wherein a pair of shaft sections are connected by a cross member having trunnions mounted in bearing blocks which are detachably mounted upon a supporting base or flange carried by each shaft section. It is the object of the invention to provide simple, effective, and economical means for securing the bearing blocks to their supporting bases. I accomplish the foregoing objects in and through the construction illustrated in the drawings forming a part hereof, wherein Figure 1 represents an elevation of two shaft sections united by a universal joint embodying my invention, certain parts being shown in section; and Figs. 2 and 3 sectional views corresponding respectively to the lines 2—2 of Fig. 1 and 3—3 of Fig. 2.

Describing the various parts by reference characters, 1 and 2 denote the shaft sections which are united by the universal joint and 3 and 4 the hub members secured to said shaft sections, respectively. Each of these hub members is provided with a supporting base 5, and each supporting base is provided with a pair of seats 6 for bearing blocks. Each seat is shown as provided with a transverse rib 7 having a wall or face 8 which is adapted to engage the coöperating face 9 of a bearing block 10.

Each of the bearing blocks shown herein is provided with a bore 11 extending from the inner face thereof toward but not through the outer face, thereby providing a well 12 for lubricant. Mounted within each bore is a bushing 13 which receives therewithin the trunnion 14 of a cross member 15 having a central lubricant well 16 from which lubricant may be conducted through radial ports 17 in said trunnions to each of the wells 12, thereby to lubricate the bearing formed between the inner wall of the bushing 13 and the outer wall of the coöperating trunnion.

Each bearing block is provided with a stud 18 mounted within a bore 19 provided therefor in the appropriate side of its supporting base.

For the purpose of anchoring the bearing blocks, I provide each stud with a recess 20 in the outer surface thereof, said recess having an inclined beveled surface 21 coöperating with the inclined end 22 of a screw 23 threaded into an aperture 24 in the supporting base and alining with the inclined portion 21 of the recess in the stud when block is seated. It will be evident that, by setting up on the screw 23, the inclined point 22 thereof will coöperate with the inclined surface 21 of the recess 20, thereby to draw the said block firmly to its seat 6 as well as to prevent the removal of the block without backing out the screw.

In order to prevent the screws from slacking off and thus loosening the blocks upon their seats, I provide each screw with a head 25 having one or more apertures 26 therethrough. These apertures serve for the reception and securing of one end of a wire 27, the opposite end of the wire being inserted through the aperture of the screw 23 which coöperates with the opposite bearing block. By this means, the wire may be secured to both screws under tension, thereby preventing the screws from slacking off or backing out.

Having thus described my invention, what I claim is:—

1. In a universal joint, the combination of a supporting base having a bore and an aperture communicating with said bore, a bearing block having a recess coöperating with said aperture, said recess having an inclined surface, and a connecting member adjustably mounted in said aperture and having a portion adapted to engage said surface thereby to draw said bearing block to its seat.

2. In a universal joint, the combination of a supporting base having a bore and an aperture communicating with said bore, a bearing block having a stud mounted in said bore and provided with a recess having an inclined surface adapted to register with said aperture, and a screw threaded in said aperture and having a tapered point adapted to engage said inclined surface.

3. In a universal joint, the combination of a supporting base having a seat and a bore extending therefrom and an aperture communicating with said bore, a bearing block having a stud adapted to enter said bore and provided with an inclined surface adapted to register with said aperture, and an adjustatble member mounted in said aperture and having an inclined surface coöperating with the inclined surface on said stud, whereby the adjustment of said member will draw the said block to its seat.

In testimony whereof I hereunto affix my signature.

WILLIAM H. THIEMER.